(12) United States Patent
Kagimoto et al.

(10) Patent No.: US 11,873,152 B2
(45) Date of Patent: Jan. 16, 2024

(54) THERMOSTATIC CONTAINER

(71) Applicant: Panasonic Intellectual Property Management Co., Ltd., Osaka (JP)

(72) Inventors: Masahiro Kagimoto, Shiga (JP); Hideji Kawarazaki, Osaka (JP); Shinya Kojima, Kyoto (JP); Tomoaki Kitano, Nara (JP); Masafumi Okawa, Osaka (JP); Toshiaki Hirano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 106 days.

(21) Appl. No.: 17/619,578

(22) PCT Filed: Jun. 12, 2020

(86) PCT No.: PCT/JP2020/023257
§ 371 (c)(1),
(2) Date: Dec. 15, 2021

(87) PCT Pub. No.: WO2020/255887
PCT Pub. Date: Dec. 24, 2020

(65) Prior Publication Data
US 2022/0348395 A1 Nov. 3, 2022

(30) Foreign Application Priority Data

Jun. 17, 2019 (JP) .................................. 2019-112243

(51) Int. Cl.
*B65D 81/18* (2006.01)
*B65D 25/10* (2006.01)
(Continued)

(52) U.S. Cl.
CPC ........... *B65D 81/18* (2013.01); *B65D 25/108* (2013.01); *B65D 25/2808* (2013.01);
(Continued)

(58) Field of Classification Search
CPC .. B65D 81/18; B65D 25/108; B65D 25/2808; B65D 43/163; B65D 77/0453;
(Continued)

(56) References Cited

U.S. PATENT DOCUMENTS

| | | | | |
|---|---|---|---|---|
| 5,943,876 A | * | 8/1999 | Meyer | ................... F25D 11/006 312/401 |
| 5,944,089 A | * | 8/1999 | Roland | ................. F28D 1/0475 165/145 |

(Continued)

FOREIGN PATENT DOCUMENTS

| | | |
|---|---|---|
| CN | 108496037 A | 9/2018 |
| JP | 2001066036 A | 3/2001 |

(Continued)

OTHER PUBLICATIONS

Japanese Office Action issued in corresponding Japanese Patent Application No. 2021-528187, dated Jun. 28, 2022, with English translation.

(Continued)

*Primary Examiner* — Kareen K Thomas
(74) *Attorney, Agent, or Firm* — Rimon P.C.

(57) ABSTRACT

Provided is a thermostatic container that improves both the communication radio wave transmissivity and keeping cold performance of a thermostatic container. A thermostatic container includes: a vacuum heat insulating container; a vacuum heat insulating lid configured to close the vacuum heat insulating container; a box body housed inside the vacuum heat insulating container; a box lid configured to close the box body; and a phase change material provided on (Continued)

a bottom portion and a wall portion of the box body and the box lid. An area made of a radio wave transmissive organic substance is provided on a path leading from inside of the box body to outside of the heat insulating container.

7 Claims, 4 Drawing Sheets

(51) Int. Cl.
 B65D 25/28 (2006.01)
 B65D 43/16 (2006.01)
 B65D 77/04 (2006.01)
 B65D 81/38 (2006.01)
(52) U.S. Cl.
 CPC ....... *B65D 43/163* (2013.01); *B65D 77/0453* (2013.01); *B65D 81/3816* (2013.01); *B65D 81/3818* (2013.01); *B65D 81/3823* (2013.01)
(58) Field of Classification Search
 CPC ............ B65D 81/3816; B65D 81/3818; B65D 81/3823; B65D 81/3841; B65D 25/02; B65D 25/20; B65D 81/02; B65D 81/2015; F25D 29/005; F25D 2303/0843; F25D 2303/0844; F25D 2303/0845; F25D 2700/12; F25D 3/08; F25D 23/06; F25D 2201/14; Y02E 60/14
 See application file for complete search history.

(56) References Cited

U.S. PATENT DOCUMENTS

| | | | | |
|---|---|---|---|---|
| 5,998,771 A * | 12/1999 | Mariano | ................ | H05B 6/64 219/528 |
| 6,308,518 B1 * | 10/2001 | Hunter | .................... | F25B 21/02 62/3.6 |
| 6,686,003 B2 * | 2/2004 | Legare | .................... | E05G 1/024 428/920 |
| 7,240,513 B1 * | 7/2007 | Conforti | ................ | A45C 13/02 62/457.2 |
| 2002/0134962 A1 * | 9/2002 | Romero | .................. | C09K 5/066 252/70 |
| 2004/0079793 A1 * | 4/2004 | Mayer | ................ | B65D 81/3816 229/103.11 |
| 2004/0079794 A1 * | 4/2004 | Mayer | ................ | B65D 81/3862 229/103.11 |
| 2004/0231355 A1 * | 11/2004 | Mayer | .................... | C09K 5/063 62/457.2 |
| 2005/0150244 A1 * | 7/2005 | Hillmann | ........... | B65D 81/3832 62/457.2 |
| 2006/0060494 A1 * | 3/2006 | Goodman | ........ | A61B 5/150305 604/408 |
| 2009/0049845 A1 * | 2/2009 | McStravick | .......... | A61M 5/003 62/3.62 |
| 2019/0001626 A1 | 1/2019 | Shinoki et al. | | |
| 2020/0317423 A1 | 10/2020 | Knight | | |
| 2021/0292078 A1 | 9/2021 | Knight | | |

FOREIGN PATENT DOCUMENTS

| | | |
|---|---|---|
| JP | 2008030790 A | 2/2008 |
| JP | 2010-285219 A | 12/2010 |
| JP | 2012171733 A | 9/2012 |
| JP | 2013103747 A | 5/2013 |
| JP | 2017052522 A | 3/2017 |
| JP | 2019-014481 A | 1/2019 |
| WO | 2017/207974 A1 | 12/2017 |

OTHER PUBLICATIONS

Extended European Search Report issued in corresponding European Patent Application No. 20826030.7, dated Jul. 4, 2022.
International Search Report and Written Opinion issued in corresponding International Patent Application No. PCT/JP2020/023257, dated Aug. 18, 2020, with partial English translation.

* cited by examiner

THERMOSTATIC CONTAINER

CROSS-REFERENCE TO RELATED APPLICATIONS

This application is the U.S. National Phase under 35 U.S.C. § 371 of International Application No. PCT/JP2020/023257, filed on Jun. 12, 2020, which claims the benefit of Japanese Application No. 2019-112243, filed on Jun. 17, 2019, the entire contents of each are hereby incorporated by reference.

TECHNICAL FIELD

The present invention relates to a thermostatic container.

BACKGROUND ART

A thermostatic container has been conventionally used as a container for maintaining a stored item within a certain temperature range for a certain time. A vacuum heat insulating material is used in the thermostatic container to improve a heat insulating property. A vacuum heat insulating material manufactured by sealing, under reduced pressure, a core material with a cover material including an aluminum layer formed by vapor deposition or lamination is used (e.g., refer to Patent Literature 1). Further, a water-based cold storage agent made of water and a gelling agent is used as a cold insulator inside the thermostatic container.

Further, for a stored item that requires temperature control, a temperature senor or the like may be packed with a transported item to grasp a transport condition to enable transport environment information such as temperature to be recognized.

CITATION LIST

Patent Literature

[Patent Literature 1]
Japanese Patent Laid-Open No. 2008-030790

SUMMARY OF INVENTION

Technical Problem

When a stored item is, for example, an investigational drug, it is required that the investigational drug be maintained within a specific temperature range (e.g., 2° C. to 8° C.). In addition, it is also required that transport environment information such as the temperature of the investigational drug in a transported state be recognized and the investigational drug be appropriately managed in the course of transport.

However, since the aluminum layer included in the cover material of the vacuum heat insulating material reflects radio waves, it is difficult for radio waves for communication to pass through the vacuum heat insulating material. Thus, it is difficult to transmit information such as the temperature inside the thermostatic container from the thermostatic container covered with the vacuum heat insulating material to the outside of the thermostatic container using radio waves.

An object of the present invention, which has been made in view of the above circumstances, is to provide a thermostatic container that improves both the communication radio wave transmissivity and keeping cold performance of the thermostatic container.

Solution to Problem

In order to achieve the above object, a thermostatic container according to an aspect of the present invention includes: a heat insulating container; a heat insulating lid configured to close the heat insulating container; a box body housed inside the heat insulating container; a box lid configured to close the box body; and a phase change material provided on a bottom portion and a wall portion of the box body and the box lid. An area made of a radio wave transmissive organic substance is provided on a path leading from inside of the box body to outside of the heat insulating container.

Accordingly, it becomes easy for radio waves to pass from the inside of a storage space to the outside of the thermostatic container through the part made of only the radio wave transmissive organic substance. This makes it easy to transmit radio waves from the inside of the storage space to the outside of the thermostatic container.

Note that the entire contents of Japanese Patent Application No. 2019-112243 filed on Jun. 17, 2019 are incorporated in this specification.

Advantageous Effects of Invention

According to the aspect of the present invention, information inside the storage space can be easily read from the outside of the thermostatic container in a state where a communication device is disposed inside the storage space and the thermostatic container is closed.

DESCRIPTION OF EMBODIMENTS

According to a first aspect of the invention, a thermostatic container according to an aspect of the present invention includes: a heat insulating container; a heat insulating lid configured to close the heat insulating container; a box body housed inside the heat insulating container; a box lid configured to close the box body; and a phase change material provided on a bottom portion and a wall portion of the box body and the box lid. An area made of a radio wave transmissive organic substance is provided on a path leading from inside of the box body to outside of the heat insulating container.

Accordingly, radio waves are allowed to pass easily from the inside of a storage space to the outside of the thermostatic container through the part made of only the radio wave transmissive organic substance, which makes it easy to transmit radio waves from the inside of the storage space to the outside of the thermostatic container.

According to a second aspect of the invention, the phase change material contains paraffin as a main component.

The degree of attenuation of radio waves in the ultrahigh frequency (UHF) band and the superhigh frequency (SHF) band, the attenuation being caused by the phase change material, can be made extremely smaller than that in the case of water. Thus, information can be transmitted from the inside of the storage space to the outside of the thermostatic container using a communication line for cellular phones or radio frequency identification (RFID).

According to a third aspect of the invention, the phase change material is covered with a cover made of resin, and a peripheral edge of the cover is bent.

This makes it possible to reduce attenuation of radio waves caused by the phase change material while closely disposing the phase change material.

According to a fourth aspect of the invention, a part other than the path leading from the inside of the box body to the outside of the heat insulating container includes metal.

This makes it possible to improve the heat shielding property of the box body and enables communication using radio waves between the inside and the outside of the box body.

Hereinbelow, an embodiment of the present invention will be described with reference to the drawings.

Figure 1:
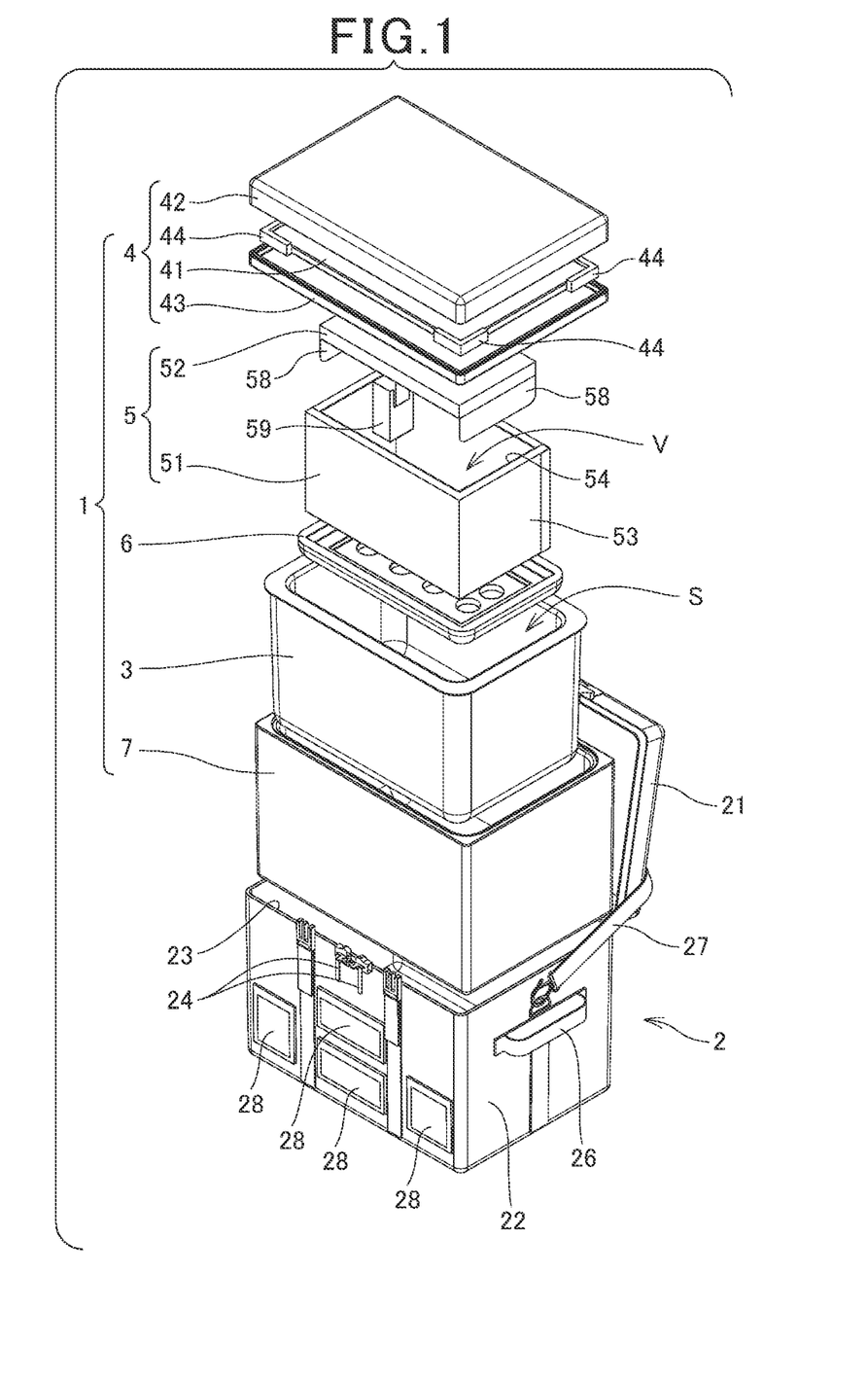
FIG. 1 is an exploded perspective view of a thermostatic container according to an embodiment of the present invention.
Figure 2:
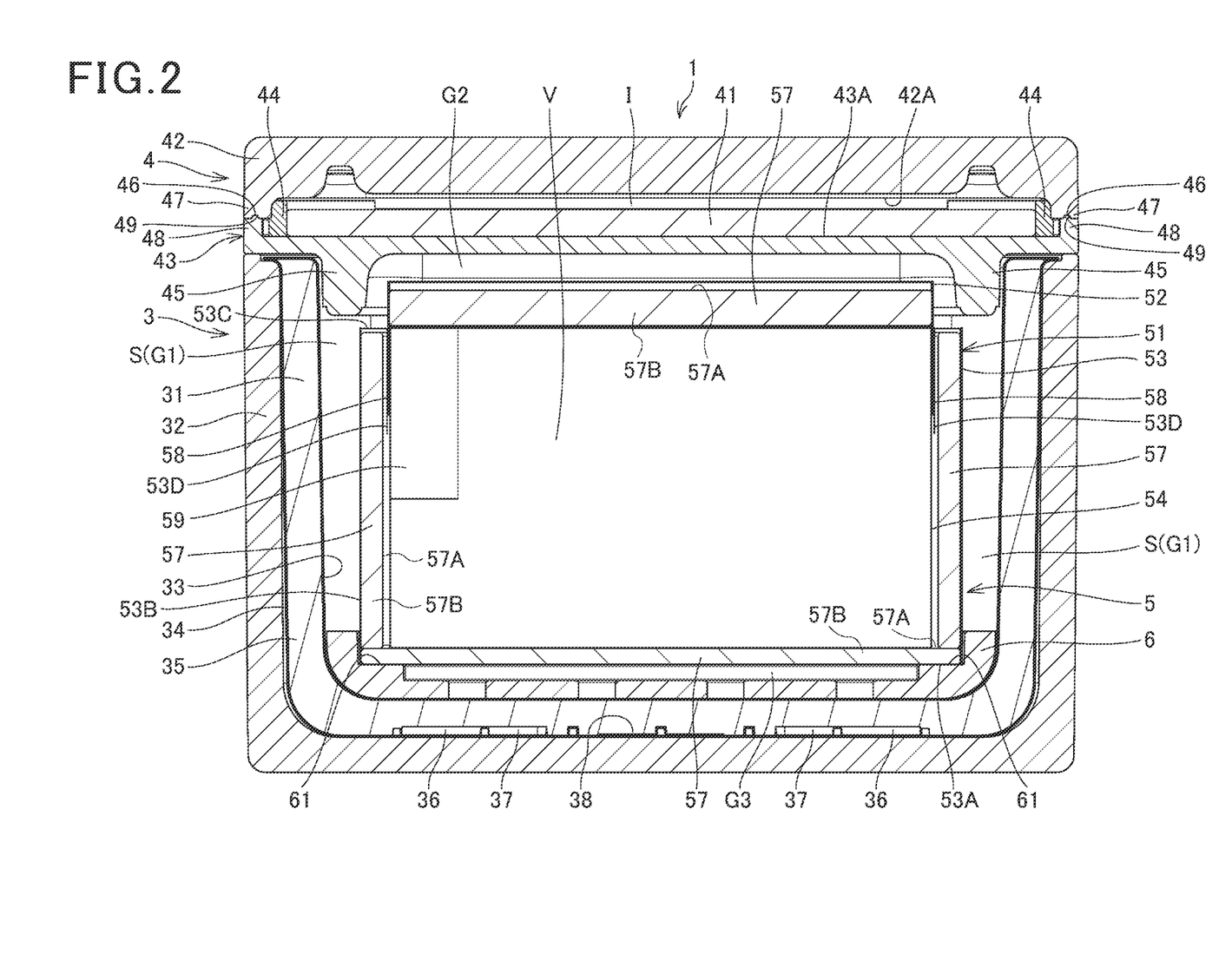
FIG. 2 is a vertical sectional view in a longitudinal direction of the thermostatic container.

FIG. 1 is an exploded perspective view of a thermostatic container 1 according to the embodiment of the present invention. FIG. 2 is a vertical sectional view in a longitudinal direction of the thermostatic container 1.

As shown in FIGS. 1 and 2, the thermostatic container 1 includes a vacuum heat insulating container 3 as a body container, a vacuum heat insulating lid 4 as a body lid, and a storage box 5 which is housed in the vacuum heat insulating container 3. The thermostatic container 1 is housed in a container case 2 when used.

Figure 3:
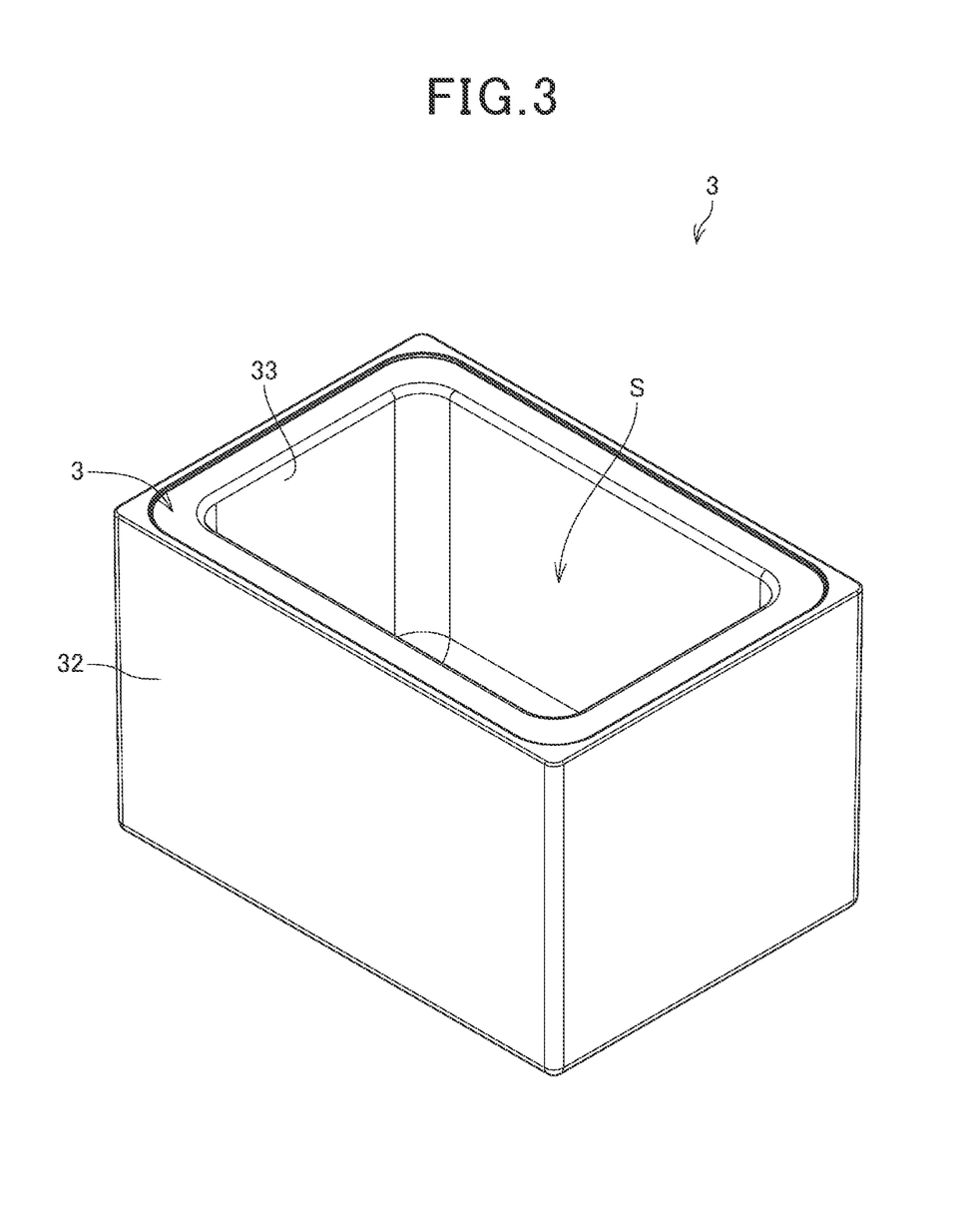
FIG. 3 is a perspective view of a body container.

FIG. 3 is a perspective view of the vacuum heat insulating container 3.

The vacuum heat insulating container 3 includes an outer cover material 34.

The outer cover material 34 is formed in a box shape with an open upper face, and an inner cover material 33 is disposed inside the outer cover material 34. The inner cover material 33 has a dimension that allows a predetermined clearance to be left from each side face and a bottom face of the outer cover material 34. A core material 35 is housed between the outer cover material 34 and the inner cover material 33.

An outer peripheral edge between the outer cover material 34 and the inner cover material 33 is sealed with the core material 35 disposed between the outer cover material 34 and the inner cover material 33. Air between the outer cover material 34 and the inner cover material is discharged to form the vacuum heat insulating container 3 which includes the core material 35 sealed under reduced pressure and has a vacuum heat insulating function.

Although the outer cover material 34 and the inner cover material 33 are not limited to any particular material, the outer cover material 34 and the inner cover material 33 are molded of a resin material having an excellent gas barrier property. For example, a moldable resin, such as polypropylene or an ethylene-vinyl alcohol copolymer, is used.

The core material 35 is not limited to any particular material. The core material 35 is made of, for example, polyol or isocyanate. A material used as a core material of a vacuum heat insulating material, such as urethane foam having an open-cell structure, a molded article made of glass fiber, or a molded article made of fumed silica, can be used.

As shown in FIG. 3, a storage space S is provided inside the vacuum heat insulating container 3.

A gas adsorbent 36, a water adsorbent 37, and a reinforcing plate 38 having a hole on its center are disposed between a bottom portion of the outer cover material 34 and the core material 35. The vacuum heat insulating container 3 releases less heat from a bottom face than from each side face. Thus, disposing the gas adsorbent 36, the water adsorbent 37, and the reinforcing plate 38 on the bottom face of the vacuum heat insulating container 3 does not interfere with a heat insulating effect.

An exhaust hole for evacuating the vacuum heat insulating container 3 is provided at a position corresponding to the hole of the reinforcing plate 38 of the outer cover material 34, and the exhaust hole is closed with a sealing material (not illustrated) after the evacuation of the vacuum heat insulating container 3. The reinforcing plate 38 can reduce deformation around the exhaust hole and support the sealing material in evacuation or closing the exhaust hole with the sealing material.

A body protection case 32 is a housing that covers an outer surface of the vacuum heat insulating container 3. The body protection case 32 may be formed of a resin having a heat insulating property, such as styrene foam. Further, when the body protection case 32 is formed of a resin having shock absorbency, shock to the vacuum heat insulating container 3 is reduced.

The vacuum heat insulating lid 4 is a member that closes an opening of the vacuum heat insulating container 3.

As shown in FIG. 2, the vacuum heat insulating lid 4 includes a lid outer protection case 42 having an outer shape similar to the outer shape of the body protection case 32. An upper joint portion 47 extending downward is formed on a peripheral edge of a lower face of the lid outer protection case 42 over the entire circumference of the lid outer protection case 42. A joint recess 46 is formed on a lower face of the upper joint portion 47.

An outer housing portion 42A which is surrounded by the upper joint portion 47 and has a recessed shape is formed on the lower face of the lid outer protection case 42.

A lid inner protection case 43 is disposed under the lid outer protection case 42. A lower joint portion 48 extending upward is formed on a peripheral edge of an upper face of the lid inner protection case 43 over the entire circumference of the lid inner protection case 43. A joint projection 49 is formed on an upper face of the lower joint portion 48.

An inner housing portion 43A which is surrounded by the lower joint portion 48 and has a recessed shape is formed on the upper face of the lid inner protection case 43.

The lid outer protection case 42 and the lid inner protection case 43 are integrally formed by joining the joint recess 46 of the upper joint portion 47 and the joint projection 49 of the lower joint portion 48 to each other. In this state, a predetermined internal space I is defined by the outer housing portion 42A of the lid outer protection case 42 and the inner housing portion 43A of the lid inner protection case 43.

A vacuum heat insulating plate 41 is housed in the internal space I. Fixing members 44 each having a substantially L shape are attached to four corners of the vacuum heat insulating plate 41. The vacuum heat insulating plate 41 can be fixed so as not to move inside the internal space I by the fixing members 44 abutting against the four corners of the internal space I in a state where the vacuum heat insulating plate 41 is housed in the internal space I.

The vacuum heat insulating plate 41 may be fixed to the lid outer protection case 42 and the lid inner protection case 43 by using not the fixing members 44 each having a substantially L shape, but, for example, a linear fixing member provided along each side of the vacuum heat insulating plate 41 or an adhesive.

Although, in the present embodiment, the vacuum heat insulating plate 41 is formed of the same material as the vacuum heat insulating container 3, for example, a vacuum heat insulating material including a core material sealed-in with a resin film having a gas barrier property may be used as the vacuum heat insulating plate 41.

In the present embodiment, the lid outer protection case 42 and the lid inner protection case 43 are formed of the same material as the body protection case 32.

A projecting portion 45 projecting downward is formed near an outer periphery of a lower face of the lid inner protection case 43. The projecting portion 45 is configured in such a manner that an outer side face of the projecting portion 45 abuts against an inner side face of the vacuum heat insulating container 3 in a state where the vacuum heat insulating lid 4 is attached to the vacuum heat insulating container 3 to close the upper face of the vacuum heat insulating container 3. Providing the projecting portion 45 in this manner makes it possible to set a long heat entry path between the vacuum heat insulating container 3 and the vacuum heat insulating lid 4, thereby improving the heat insulating performance of the thermostatic container 1.

Figure 4:
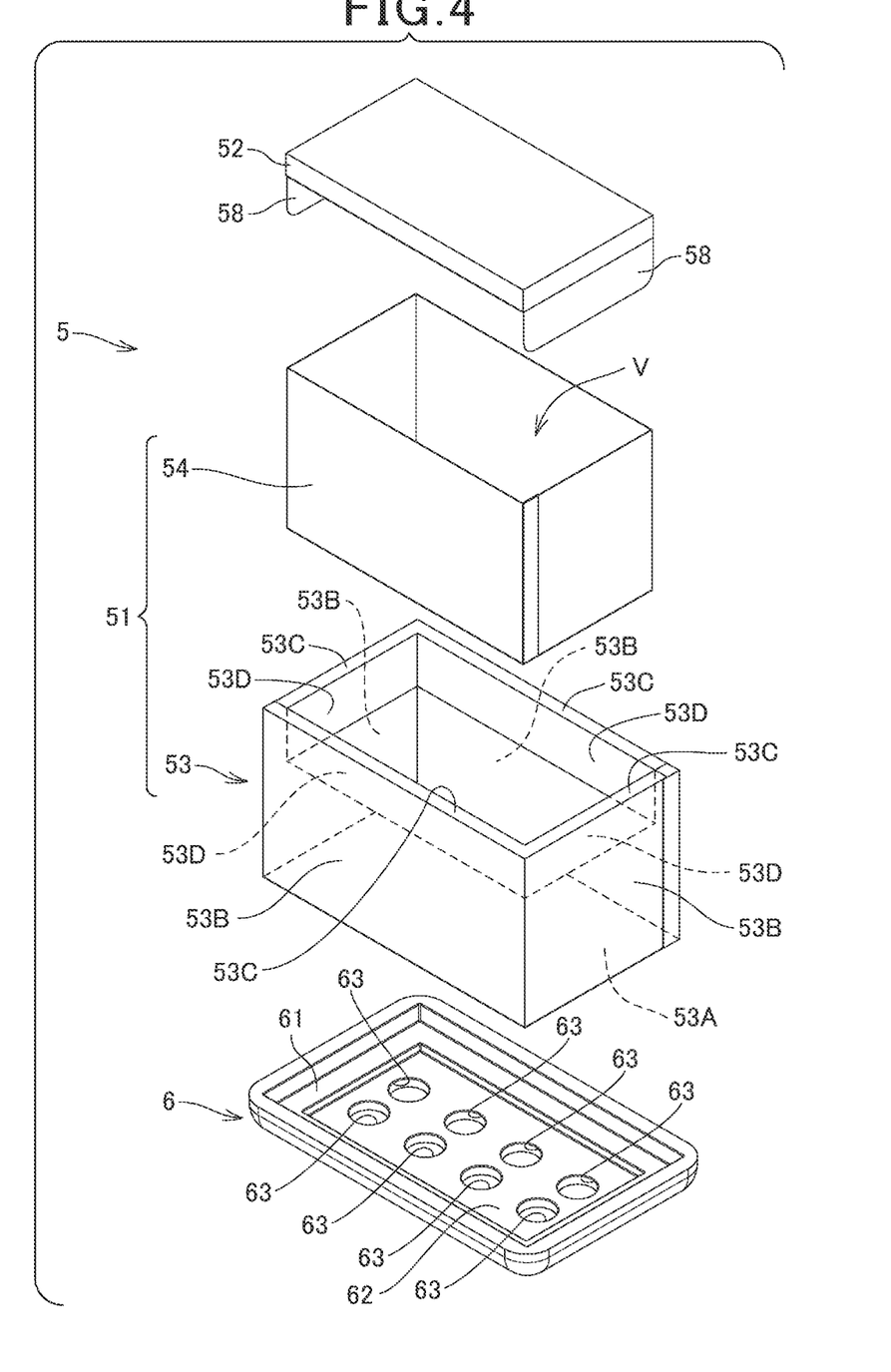
FIG. 4 is an exploded perspective view of a storage box and a fixing body.

FIG. 4 is an exploded perspective view of the storage box 5 and a support member 6. In FIG. 4, a logger case 59 is omitted.

The storage box 5 is removably housed in the storage space S of the vacuum heat insulating container 3, and the storage box 5 includes a box body 51 and a box lid 52 as shown in FIG. 4.

The box body 51 includes an outer box 53 having a box shape with an open upper face. The outer box 53 includes a bottom plate 53A having a rectangular shape and four side plates 53B which are provided in a standing manner on four sides of the bottom plate 53A. An upper plate 53C is formed on an upper end edge of each of the side plates 53B, the upper plate 53C extending inward of the outer box 53 with a predetermined width dimension. A folded-back plate 53D extending downward is integrally formed with an inner edge of each of the upper plates 53C. The folded-back plate 53D extends up to a position corresponding to a midway part of each side plate 53B.

An inner box 54 having a box shape with an open upper face is housed inside the outer box 53. The inner box 54 is formed in such a manner as to abut against an inner face of the folded-back plate 53D.

The outer box 53 and the inner box 54 are both molded into a box shape by bending a sheet-like resin material having plasticity. Examples of the resin material include transparent polypropylene and ABS resin.

Cold storage agents 57 each having a flat-plate shape are stored between each side plate 53B and the corresponding folded-back plate 53D and on an upper face of the bottom plate 53A of the outer box 53. The cold storage agent 57 disposed on the bottom plate 53A is disposed over substantially the entire face of the bottom plate 53A, and a lower end of the cold storage agent 57 disposed on each side plate 53B is in contact with the cold storage agent 57 disposed on the bottom plate 53A.

The cold storage agents 57 are stored in the box body 51 and the box lid 52 with peripheral edges of covers 57A bent. The covers 57A are bent in such a manner as not to be located between the adjacent cold storage agents 57. This enables the cold storage agents 57 to be closely disposed.

That is, the cold storage agents 57 are disposed on the bottom portion and the wall portion of the box body 51 with no thermal gap therebetween. This makes it possible to reduce heat transfer from the outside of the storage box 5, thereby maintaining the inside of the storage box 5 within a predetermined temperature range.

Since each folded-back plate 53D is formed up to the position corresponding to the midway part of the corresponding side plate 53B, it is easy to store the cold storage agent 57 between each side plate 53B and the corresponding folded-back plate 53D.

Each cold storage agent 57 is held between the outer box 53 and the inner box 54 by storing the inner box 54 inside the outer box 53 after storing the cold storage agent 57. This makes it possible to reliably support and fix each cold storage agent 57 having a plate shape and prevent the cold storage agents 57 from separating from each other during conveyance of the thermostatic container 1.

A storage space V is provided inside the box body 51, that is, inside the inner box 54.

The box lid 52 is a member that closes an opening of the box body 51 to constitute a top face of the storage box 5. The box lid 52 is formed in a thin box shape by bending the same resin material as the box body 51, and the outer shape of the box lid 52 is substantially the same as the shape of the upper opening of the box body 51.

Insertion portions 58 each of which extends downward and has a plate shape (flap shape) are formed on respective lower edges of the box lid 52, the lower edges being located on the opposite sides in the longitudinal direction. Each of the insertion portions 58 has the same width dimension as the box lid 52.

In closing the upper opening of the box body 51 with the box lid 52, each insertion portion 58 is inserted between the corresponding folded-back plate 53D and the inner box 54 to fix the box lid 52.

The box lid 52 has substantially the same shape as the upper opening of the box body 51 and the width dimension of the insertion portions 58 is the same as the width dimension of the box lid 52. Thus, each of the insertion portions 58 inserted between the folded-back plate 53D and the inner box 54 is located on the width of the upper opening of the box body 51, which enables appropriate positioning of the box lid 52 on the box body 51.

The cold storage agent 57 is stored inside the box lid 52.

The cold storage agents 57 maintain the inside of the storage box 5 at a temperature lower than room temperature, for example, at approximately 2 to 8° C. Each of the cold storage agents 57 of the present embodiment includes a phase change material 57B capable of using transition heat caused by phase change or phase transition of a substance, and stores such transition heat as heat energy and is used as a latent heat storage material. The cold storage agent 57 is formed by covering the phase change material 57B with a resin cover 57A.

When the cold storage agent 57 is cooled, the phase change material 57B undergoes a phase change from liquid or gel to solid. On the other hand, when the cold storage agent 57 absorbs heat to increase its temperature, the phase change material 57B undergoes a phase change from solid to liquid or gel. That is, the cold storage agent 57 is brought into a state where cold heat is stored through the phase change of the phase change material 57B to solid, which enables the cold storage agent 57 to absorb heat.

A phase change material obtained by appropriately mixing an additive to various paraffins to adjust a freezing point or a melting point where a phase change occurs to a predetermined temperature is used as the phase change material 57B of the cold storage agent 57 of the present embodiment.

By using such a phase change material 57B, attenuation of radio waves in the UHF and SHF bands can be made extremely smaller than that in the case of water. Thus, information can be efficiently transmitted from the inside of the storage box 5 to the outside of the thermostatic container 1 using a communication line for cellular phones or RFID.

The logger case 59 in which a data logger including various sensors is housed is provided on a corner inside the storage box 5. For example, as the data logger, a data logger capable of measuring temperature can be used. Further, a data logger capable of measuring position and acceleration and transmitting information of the measured position and acceleration can be used.

The support member 6 is housed in a bottom portion of the storage space S of the vacuum heat insulating container 3.

The support member 6 is formed in a substantially flat-plate shape, and a support recess 61 having substantially the same shape as the outer shape of the storage box 5 is formed on an upper face of the support member 6.

The support member 6 is formed of, for example, a heat insulating material such as styrene foam.

The storage box 5 is housed, and supported and fixed inside the vacuum heat insulating container 3 by being placed on the support recess 61 of the support member 6. In this state, an outer side face of the storage box 5 is disposed with a predetermined clearance G1 left from the inner side face of the vacuum heat insulating container 3. Similarly, the box lid 52 is disposed with a predetermined clearance G2 left from the lower face of the vacuum heat insulating lid 4 and the projecting portion 45.

Further, a clearance G3 is provided between the bottom plate 53A of the storage box 5 and the clearance recess 62. Further, the clearance recess 62 includes a plurality of through holes 63.

The thermostatic container 1 is housed in the container case 2 so that the thermostatic container 1 is easily carried in conveying a stored item. The container case 2 includes a case body 22 having a box shape with an open upper face and a case lid 21 which is coupled to one side edge of an upper portion of the case body 22.

The case lid 21 and the case body 22 can be closed with a case fastener 23. A handle 24 is attached to the case fastener 23 to open and close the case fastener 23.

A plurality of case lid fixtures 25 are provided on a front face of the case body 22. A plurality of fixing belts provided on a top face of the case lid 21 are coupled to the case lid fixtures 25 so that the container case 2 and the thermostatic container 1 can be more reliably maintained in a closed state.

Handles 26 are provided on respective side faces of the container case 2, and a conveyance belt 27 is coupled to the side faces. The handles 26 and the conveyance belt 27 enable easy conveyance of the container case 2 and the thermostatic container 1.

A plurality of document storage portions 28 are provided on the front face of the container case 2.

Next, the material of the thermostatic container 1 will be described in more detail.

The inner cover material 33 and the outer cover material 34 of the vacuum heat insulating container 3 are molded of a resin having a gas barrier property. As such a resin, instead of polypropylene described above, a resin that releases a small amount of gas in a vacuum, such as polyethylene or an ethylene-vinyl alcohol copolymer, may be used. As the core material, instead of rigid urethane foam, a material used as a core material of a vacuum heat insulating material such as glass wool or fumed silica powder may be used.

For also the vacuum heat insulating plate 41, instead of polypropylene, a resin that releases a small amount of gas in a vacuum, such as polyethylene or an ethylene-vinyl alcohol copolymer, may be used as the cover material. As the core material, instead of rigid urethane foam, a material used as a core material of a vacuum heat insulating material such as glass wool or fumed silica powder may be used.

In this manner, the vacuum heat insulating container 3 and the vacuum heat insulating plate 41 constitute the heat insulating container including the core material 35 sealed under reduced pressure without using metal. Accordingly, the thermostatic container 1 includes the members made of resin, which is an organic substance.

The body protection case 32, the lid outer protection case 42, and the lid inner protection case 43 are also formed of resin as described above.

The storage box 5 is also formed of resin, and a paraffin-based material is used as the phase change material 57B of each cold storage agent 57. Further, resin such as polyethylene, PET, or polypropylene is used as the cover 57A of each cold storage agent 57.

The container case 2 which houses the thermostatic container 1 during conveyance may be formed of chemical or natural fiber cloth or resin.

Next, the action of the present embodiment will be described.

Since the thermostatic container 1 includes no metal in each part and is formed of resin, radio waves can pass through the thermostatic container 1. Radio waves can be transmitted from the storage space V of the storage box 5 to the outside of the thermostatic container 1.

Even in a state where the thermostatic container 1 is housed in the container case 2, radio waves can pass through the thermostatic container 1 and the container case 2.

In this manner, in the thermostatic container 1, radio waves can be transmitted from the storage space V to the outside of the thermostatic container 1 while ensuring a heat insulating property to the storage space V without covering the storage space V with a metal member that hardly transmits radio waves, such as aluminum foil.

When a communication device such as a data logger is disposed in the logger case 59 inside the storage box 5, the communication device inside the storage box 5 and a communication device outside the thermostatic container 1 can communicate with each other using radio waves. For example, a temperature sensor having a communication function may be disposed inside the logger case 9 inside the storage box 5 to transmit temperature information inside the storage box 5 in the course of transport to the communication device disposed outside the thermostatic container 1.

Accordingly, it is possible to measures temperature near an item stored in the storage box 5 and constantly recognize temperature changes in the course of transport. In particular, in transporting pharmaceuticals, quality control can be performed also in the course of transport.

For radio wave communication between the inside of the storage box 5 and the outside of the thermostatic container 1, not all members necessarily need to be made of a radio wave transmissive resin, and it is sufficient that an area located on a path connecting the inside of the storage box 5 and the outside of the thermostatic container 1 be made of only resin.

In particular, when a positional relationship of a transmitter and a receiver with the thermostatic container is fixed, communication using radio waves can be efficiently performed by positioning the part made of only resin between the transmitter and the receiver.

When the path connecting the inside of the storage box 5 and the outside of the thermostatic container 1 is a linear path having a predetermined sectional area, transmitted radio waves are less likely to be attenuated. Further, a part included in the path through which radio waves pass is made of a resin that easily transmits radio waves, and the size thereof is appropriately determined according to the intensity and wavelength of radio waves used in communication.

That is, when the part made of only resin is disposed on the path connecting the inside of the storage box 5 and the outside of the thermostatic container 1, the other part may be formed of a material that hardly transmits radio waves, such as metal.

For example, as the vacuum heat insulating plate 41 housed in the vacuum heat insulating lid 4, a vacuum heat insulating material including a core material sealed under reduced pressure with a film having an aluminum layer may be used. This makes it possible to, in the thermostatic container 1, allow radio waves to pass through the vacuum heat insulating container 3 while reducing the influence of heat from above.

In the box lid 52, a face that does not face the storage space V may be covered with a vacuum heat insulating material including a core material sealed under reduced pressure with a film having an aluminum layer. Accordingly, even when warm air enters the upper portion of the storage space S, it is possible to allow radio waves to pass through the box body 51 while reducing influence on the cold storage agent 57 stored in the box lid 52.

As described above, in the present embodiment, the thermostatic container includes: the vacuum heat insulating container 3 as the heat insulating container; the vacuum heat insulating lid 4 as the heat insulating lid which closes the vacuum heat insulating container 3; the box body 51 housed inside the vacuum heat insulating container 3; the box lid 52 which closes the box body 51; and the phase change materials 57B provided on the bottom portion and the wall portion of the box body 51 and the box lid 52. The area made of the radio wave transmissive organic substance is provided on the path leading from the inside of the box body 51 to the outside of the vacuum heat insulating container 3.

This enables communication with the inside of the storage box 5 while ensuring the keeping cold and warm performance of the storage box 5 and the heat insulating performance of the vacuum heat insulating container 3 and the vacuum heat insulating lid 4.

Conditions inside the storage box 5 can be checked in real time by using radio waves in a state where the storage box 5 is kept cold or warm. Further, management of a transported item can be performed in a transport process.

In the present embodiment, each of the phase change materials 57B contains paraffin as a main component.

Accordingly, attenuation of radio waves in the UHF and SHF bands caused by paraffin is extremely smaller than that caused by water, and information can be efficiently transmitted from the inside of the storage box 5 to the outside of the thermostatic container 1 using radio waves in the UHF and SHF bands.

In the present embodiment, each of the phase change materials 57B is covered with the cover made of resin, and the peripheral edge of the cover is bent.

This makes it possible to closely dispose the cold storage agents 57, and the cold storage agents 57 are disposed with no thermal gap therebetween. Further, attenuation of radio waves caused by the cold storage agents 57 can be reduced.

In the present embodiment, the part other than the path leading from the inside of the box body 51 to the outside of the vacuum heat insulating container 3 includes metal.

This enables communication using radio waves between the inside and the outside of the storage space V even when the member including metal is used. Further, the heat insulating property of the storage box 5 are improved by using the vacuum heat insulating material using metal.

The present embodiment describes an aspect to which the present invention is applied, and the present invention is not limited to the embodiment described above.

For example, although the present embodiment describes the thermostatic container that keeps cold using the cold storage agents 57 as a latent heat storage material, the present invention is not limited thereto. For example, an item may be stored inside the storage box 5 within a temperature range warmer than room temperature by using a heat retaining material instead of the cold storage agents 57.

INDUSTRIAL APPLICABILITY

As described above, the thermostatic container according to the present invention can be suitably used as a thermostatic container for storing an item that is kept cold or warm within a certain temperature range and requires quality control during transport.

REFERENCE SIGNS LIST 1 thermostatic container
3 vacuum heat insulating container (heat insulating container)
4 vacuum heat insulating lid (heat insulating lid)
33 inner cover material
34 outer cover material
35 core material
41 vacuum heat insulating plate
51 box body
52 box lid
57A cover
57B phase change material

The invention claimed is:

1. A thermostatic container comprising:
a heat insulating container;
a heat insulating lid configured to close the heat insulating container;
a box body housed inside the heat insulating container;
a box lid configured to close the box body; and
a phase change material provided on a bottom portion and a wall portion of the box body and the box lid, wherein
an area made of a radio wave transmissive organic substance is provided on a path leading from inside of the box body to outside of the heat insulating container, and
the phase change materials is covered with a cover made of resin, and a peripheral edge of the cover is bent.

2. The thermostatic container according to claim 1, wherein the phase change material contains paraffin as a main component.

3. The thermostatic container according to claim 1, wherein a part other than the path leading from inside of the box body to outside of the heat insulating container includes metal.

4. The thermostatic container according to claim 1, wherein the heat insulating container comprises an outer cover material that is formed in a box shape with an open upper face, an inner cover material that has a dimension that allows a predetermined clearance to be left from each side face and a bottom face of the outer cover material, and a core material that is housed between the outer cover material and the inner cover material.

5. The thermostatic container according to claim 1, wherein the phase change material is disposed on the bottom portion and the wall portion of the box body with no thermal gap between the bottom portion and the wall portion.

6. The thermostatic container according to claim 1, wherein the phase change material contains paraffin, which attenuation of radio waves in an UHF band and an SHF band are smaller than that of water, as a main component, and constitutes a path through which radio waves that efficiently transmit information from inside of the box body to outside of the heat insulating container by using radio waves in the UHF band and the SHF band.

7. The thermostatic container according to claim 4, wherein the heat insulating container comprises a gas adsorbent that is disposed between a bottom portion of the outer cover material and the core material.

\* \* \* \* \*